United States Patent [19]
Ushikubo et al.

[11] Patent Number: 4,884,858
[45] Date of Patent: Dec. 5, 1989

[54] DISTRIBUTED COUPLER SWITCH

[75] Inventors: Takashi Ushikubo; Hideaki Okayama; Masato Kawahara; Issei Asabayashi, all of Tokyo, Japan

[73] Assignee: Oki Electric Industry Co., Ltd., Tokyo, Japan

[21] Appl. No.: 272,828

[22] Filed: Nov. 18, 1988

[30] Foreign Application Priority Data

Nov. 20, 1987 [JP] Japan .................................. 62-293360

[51] Int. Cl.$^4$ ............................................... G02B 6/10
[52] U.S. Cl. .................................... 350/96.13; 350/96.12
[58] Field of Search ............... 350/96.11, 96.12, 96.13, 350/96.14, 96.15

[56] References Cited

U.S. PATENT DOCUMENTS

| | | | |
|---|---|---|---|
| 4,693,543 | 9/1987 | Matsumura et al. | 350/96.11 |
| 4,737,003 | 4/1988 | Matsumura et al. | 350/96.14 |
| 4,795,225 | 1/1989 | Sakai et al. | 350/96.13 |

OTHER PUBLICATIONS

M. Fujiwara et al., "Gigahertz-Bandwidth InGaAsP-/InP Optical Modulators/Switches with Double-Hetero Waveguides"; Sep. 13th, 1984, Electronics Letters, vol. 20, No. 19, pp. 790-792.

Hiroaki Inour et al., "Switching Characteristics of GaAs Directional Coupler Optical Switches", May 1st, 1986, Applied Optics, vol. 25, pp. 1484-1490.

Amnon Yariv, "Coupled-Mode Theory for Guide-Wave Optics", Sep. 1973, IEEE Journal of Quantum Electronics, pp. 919-933.

Primary Examiner—William L. Sikes
Assistant Examiner—Phan T. Heartney
Attorney, Agent, or Firm—Spencer & Frank

[57] ABSTRACT

In an electro-optic distributed coupler switch having a parallel rib geometry, a coupling enhancement region formed of the same material as the upper cladding layers but of lower step height is located between the ribs. By increasing the electric field strength, the coupling enhancement region enables the coupling length $L_c$ to be reduced.

13 Claims, 7 Drawing Sheets

DISTRIBUTED COUPLER SWITCH

BACKGROUND OF THE INVENTION

This invention relates to a distributed coupler switch. Due to their high switching speed and ability to operate on low driving voltages, electro-optic distributed coupler switches (also called electro-optic directional coupler switches; hereinafter referred to as EDC switches) employing semiconductor waveguides are viewed as promising optical switch elements for optical switching systems. Various compound semiconductors, including GaAs and InP materials, have been proposed for the semiconductor waveguides of such EDC switches.

FIG. 1 shows an oblique view of a typical prior-art EDC switch. The switch in this drawing comprises an n+-GaAs substrate 10, an n-AlGaAs lower cladding layer 12 formed on the substrate 10, an i-GaAs light-guide layer 14 formed on the lower cladding layer 12, parallel stripe-geometry p-AlGaAs upper cladding layers 16a and 16b disposed on the light-guide layer 14 separated from each other by an appropriate intervening space, p-GaAs cap layers 18a and 18b formed on the upper cladding layers 16a and 16b, positive electrodes 20a and 20b formed on the cap layers 18a and 18b, and a negative electrode 22 disposed below the substrate 10. The upper cladding layer 16a, the cap layer 18a, and the electrode 20a form a first rib 24a. The upper cladding layer 16b, the cap layer 18b, and the electrode 20b form a second rib 24b. The upper cladding layers 16a and 16b are created by first covering the entire surface of the light-guide layer 14 with a p-AlGaAs layer, then etching or otherwise removing the unwanted parts to leave only the desired stripes in the regions of the first and second ribs 24a and 24b.

In the EDC switch in FIG. 1, that portion of the light-guide layer 14 directly underlying the first and second ribs 24a and 24b forms a pair of optical waveguides.

FIG. 2 shows a cross-sectional view of the main parts in FIG. 1, showing the location of the first optical waveguide 26a and the second optical waveguide 26b. The letter W in FIG. 2 represents the width of the upper cladding layers 16a and 16b, which is also the width of the first and second optical waveguides 26a and 26b; the letter S represents the spacing between the upper cladding layers 16a and 16b, which is also the spacing between the first and second optical waveguides 26a and 26b; the letter T represents the thickness of the light-guide layer 14; and letter H represents the step height of the upper cladding layers 16a and 16b.

FIG. 3 shows the optical switch in FIG. 2 labeled with respect to its approximate refractive index distribution: $n_1$ denotes the refractive index of the light-guide layer 14, $n_2$ denotes the refractive index of the lower cladding layer 12, $n_3$ denotes the refractive index of the upper cladding layers 16a and 16b, and $n_4$ denotes the refractive index of the cap layers 18a and 18b. Within the light-guide layer 14, let A designate the regions of the first and second optical waveguides 26a and 26b and let B designate the other regions. Then $n_{eq}$ is an equivalent index of refraction that arises from the difference between the propagation coefficients $\beta_A$ and $\beta_B$ when the regions A and B are considered as slab waveguides. The equivalent index of refraction $n_{eq}$ can be calculated from the following formula:

$$n_{eq}=[n_1^2-(\beta_A/k_0)^2+(\beta_B/k_0)^2]^{\frac{1}{2}}$$

where $k_0=2\pi/\lambda_0$, $\lambda_0$ being the light wavelength in vacuum.

FIG. 4 shows the relationship between the coupling length $L_c$ and the rib width W as calculated from the refractive index distribution in FIG. 3. The rib width W is given in micrometers on the horizontal axis in FIG. 4, and the coupling length $L_c$ is given in millimeters on the vertical axis. The thickness T of the light-guide layer 14 is 0.7 $\mu$m, and the wavelength of light is $\lambda=1.3$ $\mu$m. The curves in FIG. 4 correspond to rib spacings S of 3 $\mu$m, 2.5 $\mu$m, 2 $\mu$m, 1.6 $\mu$m, and 1 $\mu$m, showing the W-$L_c$ characteristic separately for each of these spacing values. It is apparent that the shorter the rib width W and the less the rib spacing S, the shorter is the coupling length $L_c$.

Although the coupling length $L_c$ of a prior-art EDC switch as described above can be reduced by decreasing the rid width W and rib spacing S, the minimum values of W and S are determined by manufacturing technology, which places a lower limit on $L_c$. This lower limit on $L_c$ in turn becomes a constraint on the fabrication of a small-size switch.

SUMMARY OF THE INVENTION

An object of the present invention is accordingly to provide an EDC switch with a short coupling length $L_c$.

To achieve this object, an EDC switch according to this invention comprises a substrate, a lower cladding layer disposed on the substrate, a light-guide layer disposed on the lower cladding layer, two parallel stripe-geometry upper cladding layers disposed on the light-guide layer, and an additional coupling enhancement region formed in the space between the two upper cladding layers, of the same material as the upper cladding layers, but of a lower step height. All the above-mentioned layers comprise compound semiconductor materials.

Provision of the coupling enhancement region in the space between the two upper cladding layers strengthens the electric field coupling in the light-guide layer. A short coupling length $L_c$ can be achieved by providing a coupling enhancement region with a suitably large step height.

DETAILED DESCRIPTION OF THE EMBODIMENTS

An embodiment of this invention will be explained with reference to the drawings.

Figure 5:
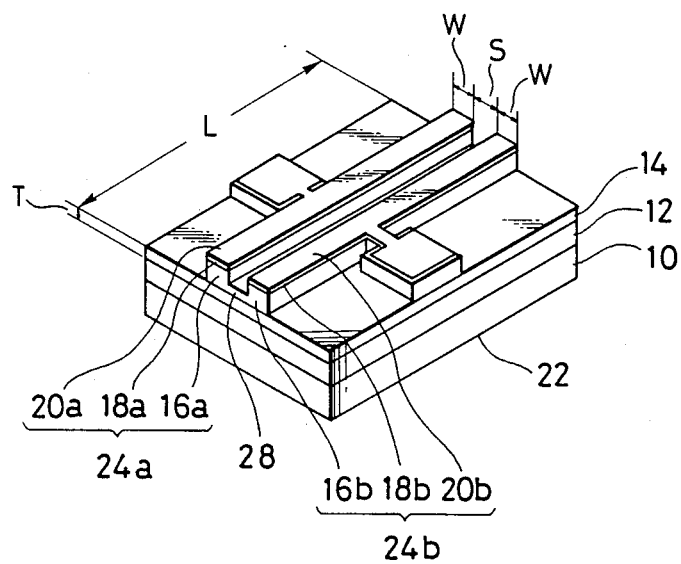
FIG. 5 is an oblique view of an embodiment of an EDC switch according to the present invention.
Figure 6:
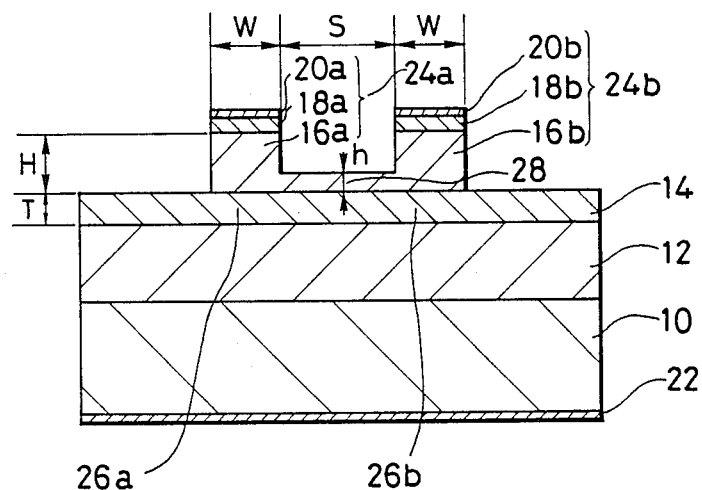
FIG. 6 is a cross-sectional view showing the main parts in FIG. 5.

FIG. 5 is an oblique view of an embodiment of an EDC switch according to this invention. A cross-sectional view of the main parts in FIG. 5 is shown in FIG. 6. These two drawings are schematic in nature, presenting only as much detail as required for an understanding of the invention; the shapes, dimensions, and positional relationships of the component elements are not restricted to those depicted in these drawings.

Figure 1:
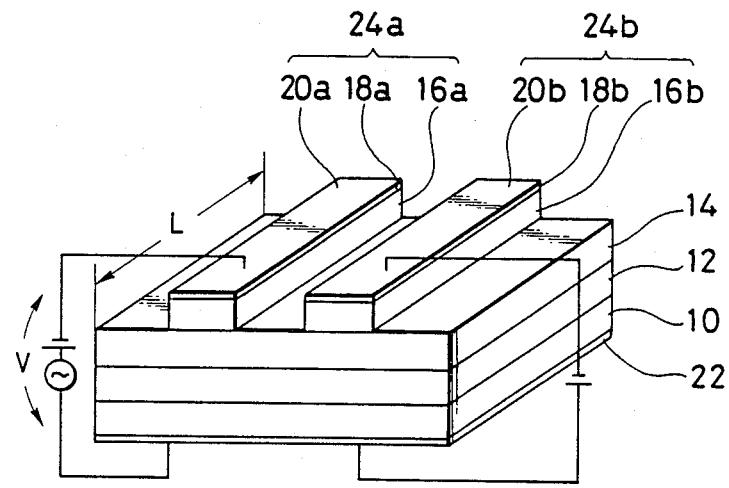
FIG. 1 is an oblique view of a prior-art EDC switch.
Figure 2:
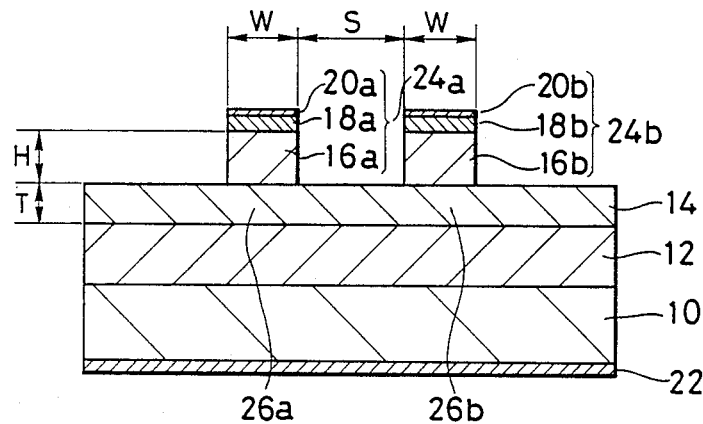
FIG. 2 is a cross-sectional view of the main parts in FIG. 1.
Figure 3:
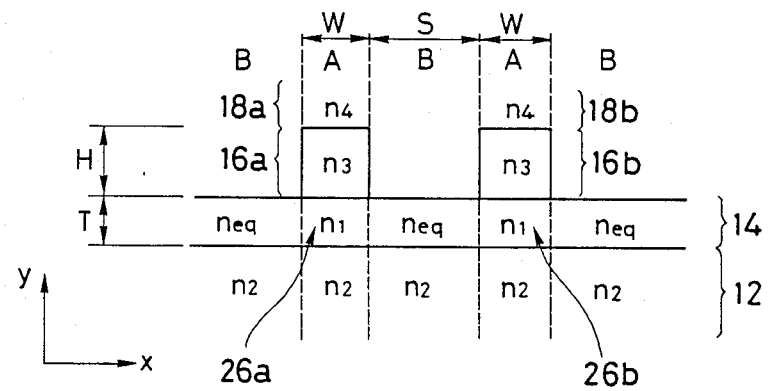
FIG. 3 is a diagram showing the approximate refractive index distribution in the cross section in FIG. 2.
Figure 4:
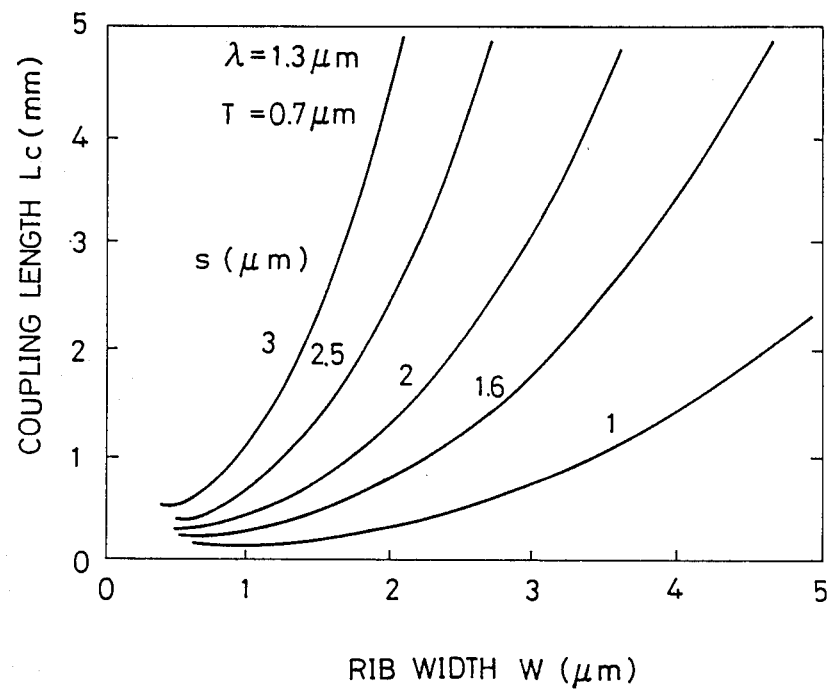
FIG. 4 is a graph showing the relationship between the coupling length $L_c$ and rib width W in this prior-art EDC switch.

In the embodiment to be explained with reference to FIG. 5 and FIG. 6, the compound semiconductor materials are GaAs and AlGaAs. Component elements identical to those in FIGS. 1 and 2 are labeled with the same reference numerals; detailed descriptions of these components will be omitted.

In this embodiment, on an n+-GaAs substrate 10 there are provided, in sequence from bottom to top, an n-AlGaAs lower cladding layer 12, an i-GaAs light-guide layer 14, a pair of parallel stripe-geometry p-AlGaAs upper cladding layers 16a and 16b, a pair of p-GaAs cap layers 18a and 18b, and a pair of positive electrodes 20a and 20b, while a negative electrode 22 is disposed beneath the n+-GaAs substrate 10. The upper cladding layer 16a, the cap layer 18a, and the positive electrode 20a form a first rib 24a. The upper cladding layer 16b, the cap layer 18b, and the positive electrode 20b form a second rib 24b.

In this embodiment, in addition to the above component elements, a coupling enhancement region 28 is provided between the upper cladding layers 16a and 16b, formed of the same material as the upper cladding layers 16a and 16b and united with them in structure, but having a step height h less than the step height H of the upper cladding layers 16a and 16b. The step height h is a design parameter that is selected according to the dimensions of light-guide layer 14, upper cladding layers 16a and 16b, and the other layers. When the step height H is 1 μm and the thickness of the light-guide layer 14 is 0.5 μm, it is desirable to set the step height h less than 0.1 μm. The coupling enhancement region 28 can be created by first forming a p-AlGaAs cladding layer over the entire surface of the light-guide layer 14, then etching away the unwanted parts. Specifically, the regions of the first and second ribs 24a and 24b, which at this point comprise the upper cladding layer 16a and upper cladding layer 16b, are not etched at all, the p-AlGaAs cladding layer in the space between them is partially etched to leave a coupling enhancement region 28 with a step height h, and the p-AlGaAs layer in the remaining area exterior to the upper cladding layers 16a and 16b is completely etched away down to the surface of the light-guide layer 14.

In this configuration, those parts of the light-guide layer 14 disposed directly below the first rib 24a and the second rib 24b function as a first optical waveguide 26a and a second optical waveguide 26b, respectively.

Figure 7:
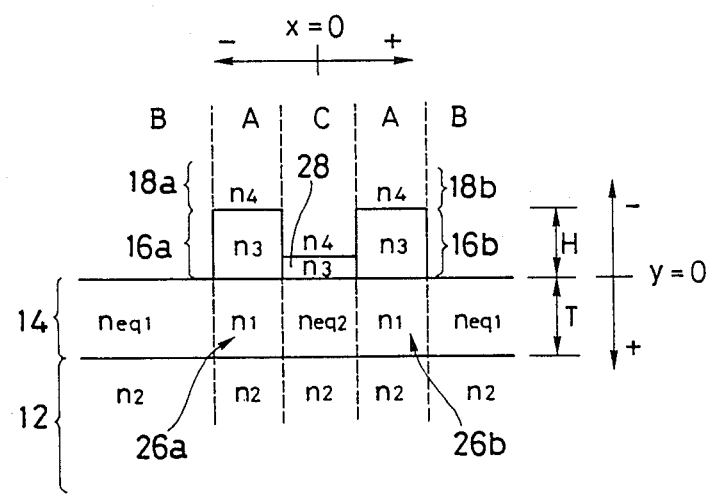
FIG. 7 is a diagram showing the approximate refractive index distribution in the cross section in FIG. 6.

FIG. 7 shows the optical switch in FIG. 6 labeled with respect to its approximate refractive index distribution: $n_1$ denotes the refractive index of the light-guide layer 14, $n_2$ denotes the refractive index of the lower cladding layer 12, $n_3$ denotes the refractive index of the upper cladding layers 16a and 16b, and $n_4$ denotes the refractive index of the cap layers 18a and 18b. Within the light-guide layer 14, let A designate the regions of the first and second optical waveguides 26a and 26b, let B designate the regions external to the first and second ribs 24a and 24b and the coupling enhancement region 28, and let C designate the region where the coupling enhancement region 28 is present.

Then $n_{eq1}$ and $n_{eq2}$ are equivalent indexes of refraction that arise from the difference between the propagation coefficients $\beta_A$, $\beta_B$, and $\beta_C$ when the regions A, B, and C are considered as slab waveguides. In the following discussion of the derivation of these eqiuivalent indexes of refraction, the x-y coordinate system is that indicated in FIG. 7, with the origin of the x-axis centered between the first optical waveguide 26a and the second optical waveguide 26b, and the origin of the y-axis located at the surface of the light-guide layer 14. The equivalent index of refraction $n_{eq1}$ in region B and the equivalent index of refraction $n_{eq2}$ in region C are given by the formulas:

$$n_{eq1} = [n_1^2 - (\beta_A/k_0)^2 + (\beta_B/k_0)^2]^{\frac{1}{2}} \qquad (1)$$

$$n_{eq2} = [n_1^2 - (\beta_A/k_0)^2 + (\beta_C/k_0)^2]^{\frac{1}{2}} \qquad (2)$$

where $k_0 = 2\pi/\lambda_0$, $\lambda_0$ being the light wavelength in vacuum.

If we consider only the $E_{pq}^x$ waveguide mode in the first and second optical waveguides 26a and 26b (which is equivalent to the $TE_{pq}$ mode), the phase constants $k_x$ and $k_y$ in the x and y directions are given by the following equations:

$$k_x W = n\pi + \tan^{-1}\left[\left(\frac{n_1}{n_{eq1}}\right)^2 \frac{k_{eq1}}{k_x}\right] + \tan^{-1}\left[\left(\frac{n_1}{n_{eq2}}\right)^2 \frac{k_{eq2}}{k_x} \cdot \frac{1 \mp \exp(-k_{eq2} \cdot S)}{1 \pm \exp(-k_{eq2} \cdot S)}\right] \qquad (3)$$

$$k_y T = m\pi + \tan^{-1}\left(\frac{k_2}{k_y}\right) + \tan^{-1}\left[\frac{k_3}{k_y} \cdot \frac{k_3 + k_4 \cdot \alpha}{k_3 \cdot + k_4}\right] \qquad (4)$$

where $$k_{eqi} = [(n_1^2 - n_{eqi}^2)k_0 - k_x^2]^{1/2} \quad (i = 1, 2)$$

$$k_j = [(n_1^2 - n_j^2) \cdot k_0^2 - k_y^2]^{1/2} \quad (j = 2, 3, 4)$$

$$\alpha = \frac{1 + \exp(2 \cdot k_3 H)}{1 - \exp(2 \cdot k_3 H)} \quad \text{(region } A\text{)}$$

$$\alpha = \frac{1 + \exp(2 \cdot k_3 h)}{1 - \exp(2 \cdot k_3 h)} \quad \text{(region } C\text{)}$$

In the $\pm$ and $\mp$ signs in equation (3), the upper sign is for even modes and the lower sign is for odd modes.

If the even-mode phase constant $k_{xe}$ and odd-mode phase constant $k_{xo}$ are determined from the equations above, the propagation constants $\beta_e$ and $\beta_o$ in those modes can be found as follows:

$$\beta_e = [(n_1 k_0)^2 - k_y^2 - k_{xe}^2]^{\frac{1}{2}}$$

$$\beta_o = [(n_1 k_0)^2 - k_y^2 - k_{xo}^2]^{\frac{1}{2}}$$

The coupling length $L_c$ is then given by the formula:

$$L_c = \pi/(\beta_e - \beta_o)$$

Figure 8:
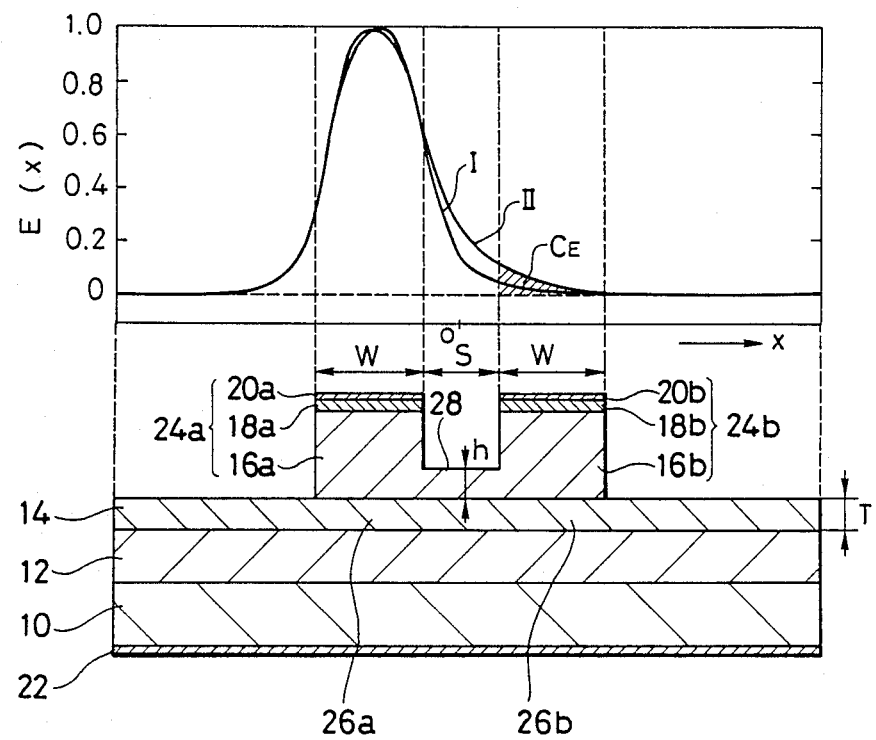
FIG. 8 is a graph showing the dependence of the electric field distribution of the step height h.

The dependence of the field distribution on the step height h of the coupling enhancement region 28 will be described with reference to FIG. 8, which shows the electric field distribution in the x direction in the light-guide layer 14 for two different values of h. A cross-sectional view of the EDC switch of this invention is shown at the bottom of FIG. 8, and the corresponding field intensity in the light-guide layer 14 is shown as a graph above it. The horizontal axis of the field distribution graph represents position on the x axis; the vertical axis represents the relative field intensity E(x). The field distribution curves were calculated with an EDC switch having a rib width W of '$\mu$m, a rib spacing S of 2 $\mu$m, and a light-guide layer 14 with a thickness T of 0.7 $\mu$m. The upper and lower cladding layers were composed of n- and p-$Al_{0.3}Ga_{0.7}As$. Curve I is for the prior-art case in which h=0. Curve II is for the inventive case of h=0.07 $\mu$m. The field intensity E(x) is the sum of the even-mode field $E_e(x)$ and the odd-mode field $E_o(x)$; that is, $E(x) = E_e(x) + E_o(x)$.

The shaded part of the graph in FIG. 8 represents the coupling $C_E$ of the electric field in the second optical waveguide 26b below the second rib 24b. It can be seen from FIG. 8 that in an EDC switch according to this invention (curve II) the area of $C_E$ is enlarged as compared with the prior art (curve I). This indicates that increasing the step height h of the coupling enhancement region 28 increases the electric field coupling between the first optical waveguide 26a and the second optical waveguide 26b. Increasing the field coupling in this way enables light to be switched from the first optical waveguide 26a to the second optical waveguide 26b in a shorter distance than in the prior art, which means that the coupling length $L_c$ of an EDC switch according to this invention can be reduced.

Figure 9:
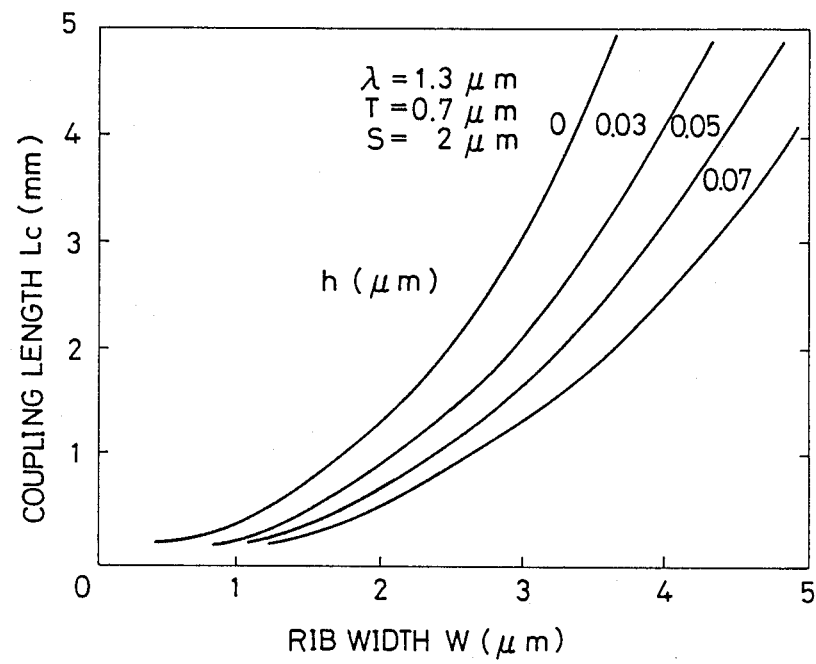
FIG. 9 is is a graph showing the relationship between the coupling length $L_c$ and rib width W in an EDC switch according to this invention.

FIG. 9 shows the relationship between the coupling length $L_c$ and the rib width W as derived from simulation results. In this relationship, the thickness T of the light-guide layer 14 was 0.7 $\mu$m, the rib spacing S was 2 $\mu$m, the step height h of the coupling enhancement region 28 was varied as a parameter taking on the values 0 $\mu$m, 0.03 $\mu$m, 0.05 $\mu$m, and 0.07 $\mu$m, and the relationship between the rib width W (um) and coupling length $L_c$ (mm) was calculated by simulation at a light wavelength of $\lambda = 1.3$ $\mu$m. The rib width W is plotted on the horizontal axis in FIG. 9 and the coupling length $L_C$ is plotted on the vertical axis.

As can be seen from these results, for a constant rib width W, increasing the step height h of the coupling enhancement region 28 reduces the coupling length $L_c$. The same tendency holds true at other values of the rib spacing S. Accordingly, for a given rib width W and rib spacing S, an EDC switch with a reduced coupling length $L_c$ can be obtained by increasing the step height h of the coupling enhancement region 28.

For example, if an EDC switch is fabricated according to this invention with the same rib width W and rib spacing S as in the prior art, by providing a sufficient step height h it is possible to reduce the coupling length $L_c$ to less than half the coupling length in the prior art. Thus a smaller EDC switch can be fabricated. This invention accordingly provides a significant advantage in devices in which EDC switch size is an important consideration.

This invention is also of utility in devices in which fabrication cost rather than size is the major consideration, because for a given coupling length $L_c$, increasing the step height h of the coupling enhancement region 28 enables the rib width W and rib width S to be larger than in the prior art. This simplifies the fabrication of the EDC switch and raises the yield of the fabrication process, thus reducing the cost per device.

The scope of this invention is not limited to the embodiment described above, but includes many modifications and variations which will be obvious to one skilled in the art. For example, the semiconductor materials need not be GaAs and AlGaAs; this invention is also applicable to EDC switches made from InP/InGaAsP and other compound semiconductor materials. Also, the light-guide layer can be made of an n-type or p-type semiconductor material instead of an i-type semiconductor material. Furthermore, it is possible to reverse the n and p conductive types of the materials used in all the layers in the embodiment.

What is claimed is:

1. A distributed coupler switch comprising:
   a substrate:
   a lower cladding layer disposed on said substrate;
   a light-guide layer disposed on said lower cladding layer; and
   a pair of parallel stripe-geometry upper cladding layers disposed on said light-guide layer;
   each of said layers being composed of compound semiconductor materials;
   said switch further comprising a coupling enhancement region disposed on said light-guide layer and extending between said upper cladding layers, said coupling enhancement region being made of the same material as said upper cladding layers but being lower than them in step height; said light-guide layer, in a region outside said upper cladding layers, having no layer thereon which is composed of a material which is the same as the material composing said coupling enhancement region.

2. A distributed coupler switch according to claim 1, wherein said lower cladding layer comprises an n-type compound semiconductor material and said upper cladding layer comprises a p-type compound semiconductor material.

3. A distributed coupler switch according to claim 2, wherein said lower cladding layer is an n-$Al_{0.3}Ga_{0.7}As$ layer and said upper cladding layers are p-$Al_{0.3}Ga_{0.7}As$ layers.

4. A distributed coupler switch according to claim 1, wherein said lower cladding layer comprises an p-type compound semiconductor material and said upper cladding layer comprises a n-type compound semiconductor material.

5. A distributed coupler switch according to claim 4, wherein said lower cladding layer is a p-$Al_{0.3}Ga_{0.7}As$ layer and said upper cladding layers are n-$Al_{0.3}Ga_{0.7}As$ layers.

6. A distributed coupler switch according to claim 1, wherein said light-guide layer comprises an i-GaAs material.

7. A distributed coupler switch according to claim 1, wherein those regions of said light-guide layer disposed directly below said upper cladding layers operate as optical waveguides.

8. A distributed coupler switch according to claim 1, wherein said upper cladding layers comprise $Al_{0.3}Ga_{0.7}As$ material, and said light-guide layer comprises an i-GaAs material.

9. A distributed coupler switch according to claim 8, wherein said lower cladding layer comprises $Al_{0.3}Ga_{0.7}As$ material.

10. A distributed coupler switch according to claim 9, wherein said upper cladding layer is of a first conductivity type, and said lower cladding layer is of a second conductivity type.

11. A distributed coupler switch according to claim 10, wherein said upper cladding layers are $p\text{-}Al_{0.3}Ga_{0.7}As$, and said lower cladding layer is $n\text{-}Al_{0.3}Ga_{0.7}As$.

12. A distributed coupler switch according to claim 10, wherein said upper cladding layers are $n\text{-}Al_{0.3}Ga_{0.7}As$, and said lower cladding layer is $p\text{-}Al_{0.3}Ga_{0.7}As$.

13. A distributed coupler switch comprising:
a substrate;
a lower cladding layer disposed on said substrate;
a light-guide layer disposed on said lower cladding layer; and
a pair of parallel stripe-geometry upper cladding layers disposed on said light-guide layer;
each of said layers being composed of compound semiconductor materials;
said switch further comprising first and second electrodes for applying an electric field to said light-guide layer and said pair of upper cladding layers, and a coupling enhancement region disposed on said light-guide layer and extending only between said upper cladding layers, said coupling enhancement region being made of the same material as said upper cladding layers but being lower than them in step height; whereby said coupling enhancement region causes the equivalent index of refraction in said light guide layer beneath said coupling enhancement region to be different than the equivalent index of refraction in said light-guide layer in regions which are disposed on either outward side of and which extend away from said upper cladding layers, whereby application of an electric field causes enhanced electric field coupling between said pair of parallel stripe-geometry upper cladding layers.

* * * * *